United States Patent [19]
Zapparoli

[11] Patent Number: 5,513,598
[45] Date of Patent: May 7, 1996

[54] GROOMING CABINET FOR PETS

[75] Inventor: Ivo Zapparoli, Via F. Parri 2, Carpi, Italy, 41012

[73] Assignees: Massimo Cucchi, Albinea; Oscar Ripamonti, Como; Ivo Zapparoli, Carpi, all of Italy

[21] Appl. No.: 211,516

[22] PCT Filed: Oct. 1, 1992

[86] PCT No.: PCT/IT92/00120

§ 371 Date: Apr. 4, 1994

§ 102(e) Date: Apr. 4, 1994

[87] PCT Pub. No.: WO93/06719

PCT Pub. Date: Apr. 15, 1993

[30] Foreign Application Priority Data

Oct. 3, 1991 [IT] Italy .................. MOA910147

[51] Int. Cl.⁶ .................................................. A01K 13/00
[52] U.S. Cl. .................. 119/85; 119/158; 119/756; 15/353
[58] Field of Search ........................ 119/156, 158, 119/159, 753, 756, 83, 85; 15/345, 346, 353, 323

[56] References Cited

U.S. PATENT DOCUMENTS

| | | | |
|---|---|---|---|
| 3,583,368 | 6/1971 | Mandelbaum et al. | 119/158 |
| 4,194,262 | 3/1980 | Finley et al. | 15/353 |
| 4,505,229 | 3/1985 | Altissimo | 119/158 |
| 4,836,144 | 6/1989 | Cole . | |

FOREIGN PATENT DOCUMENTS

| | | | |
|---|---|---|---|
| 316756 | 5/1989 | European Pat. Off. | 119/83 |
| 2543795 | 10/1984 | France . | |
| 2580467 | 10/1986 | France . | |
| 2144317 | 3/1985 | United Kingdom . | |

*Primary Examiner*—Todd E. Manahan
*Attorney, Agent, or Firm*—Bell, Seltzer, Park & Gibson

[57] ABSTRACT

A piece of furniture whose supporting structure is formed by peripheral walls and a base wall is supported by feet and wheels, has a rectangular cross-section and is closed by a tray-like covering element at its upper end. The piece of furniture is divided into at least two spaces, one of which is sealed and the other contains an annular blower, driven by an electric motor, and also a tank with a vertical axis, at whose upper end a filter is introduced. A suction duct leads to the aperture of the tank, and terminates on the outside forming a pipe union for the connection to a flexible tube which ends into a hose. The suction aperture of the blower is connected to the tank by way of a duct which ends into the tank below the filter, whereas the emission aperture of hot air under pressure of the blower is connected to the duct which projects out of the piece of furniture forming a pipe union for the connection to a flexible linking tube, which ends into a hose.

10 Claims, 4 Drawing Sheets

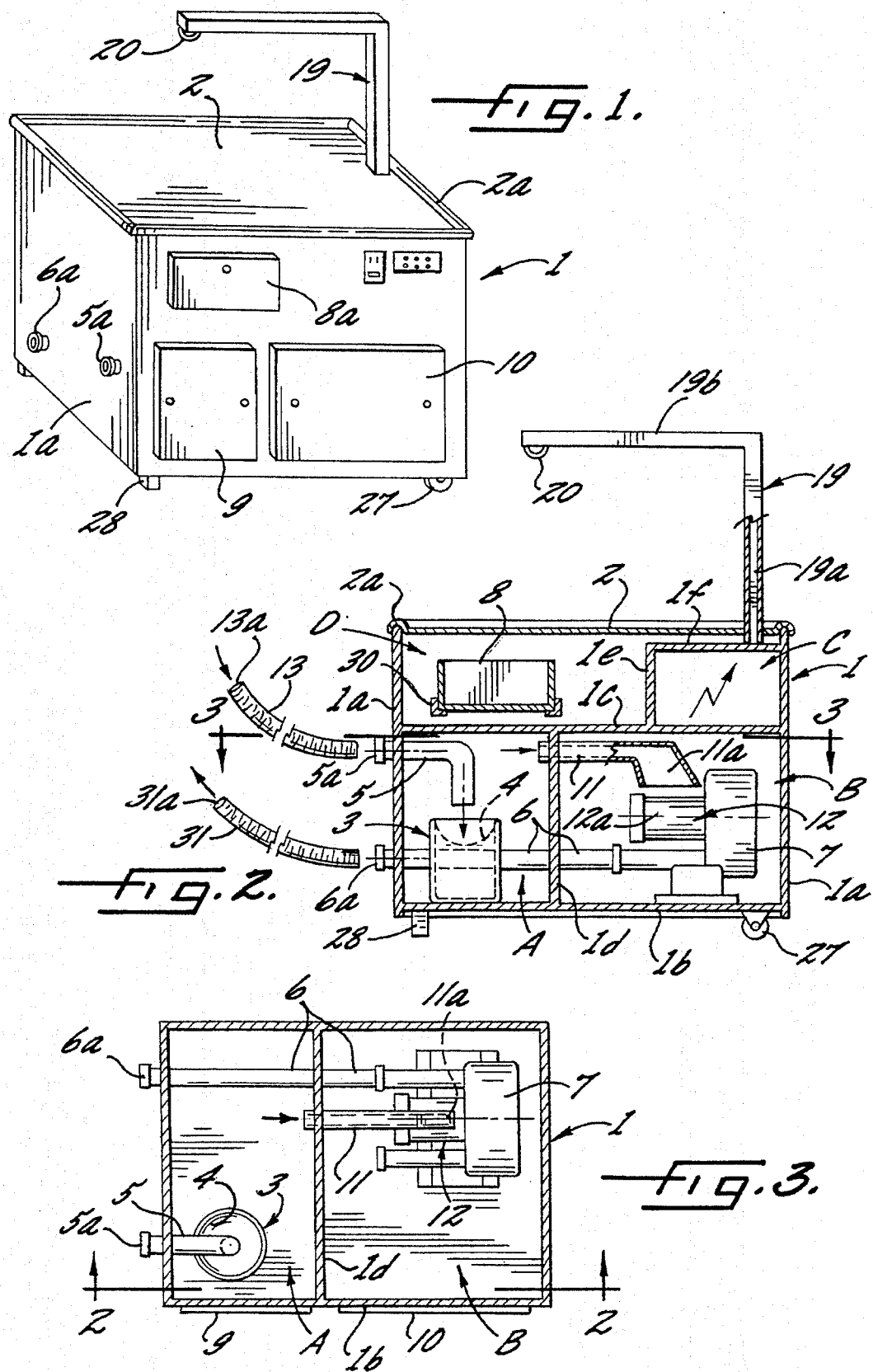

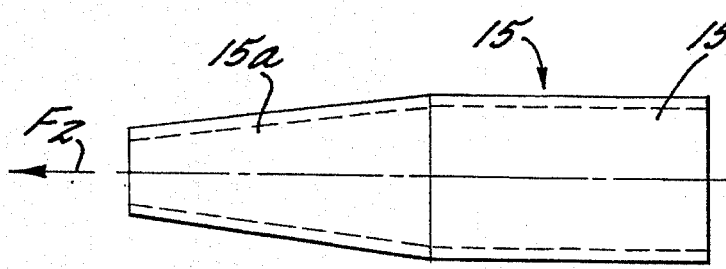
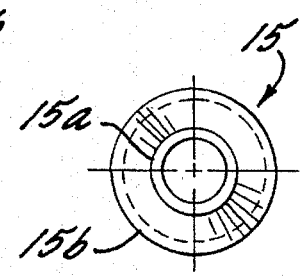
Fig. 10.  Fig. 11.
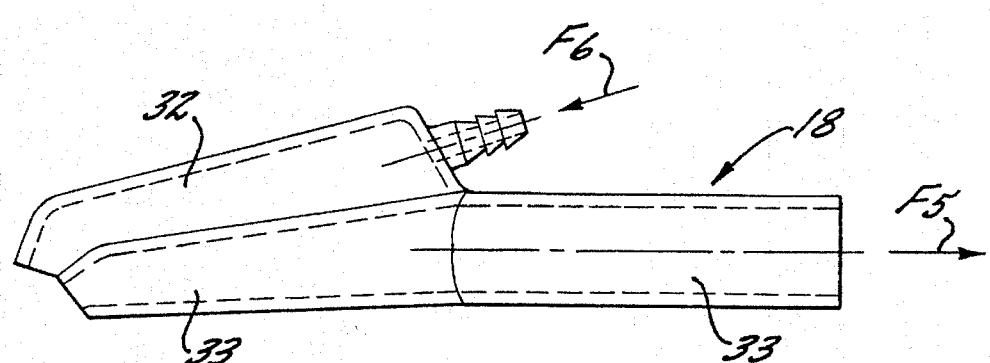
Fig. 12.
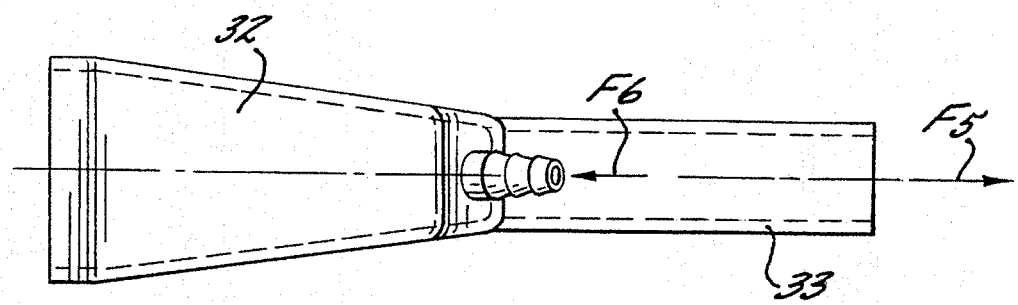
Fig. 13.
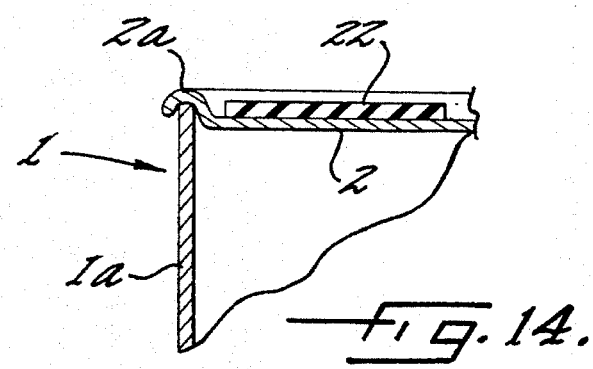
Fig. 14.

5,513,598

GROOMING CABINET FOR PETS

TECHNICAL FIELD

The present invention refers to a piece of furniture having a rectangular horizontal base, supported by two coaxial wheels and by two feet, and closed upwardly by a horizontal tray-like element, which constitutes a working table for supporting at least one animal. The piece of furniture is divided into at least two chambers or spaces, the upper one of which is sealed. The other one(s) is/are used for lodging means cooperating with pipes or ducts terminating into hoses, which are able to suck water, detached hairs and other impurities present on the animal's body after its cleaning, and said means being also able to dry up the animal's fur with the help of a stream of hot air under pressure. Said hairs or impurities are retained in a filter and the water is retained in a collecting tank.

BACKGROUND OF THE INVENTION

Presently, no such means and devices are known according to the state of the art, which perform such operations and which are employed for such purposes. In particular, no device is known which prior to drying, is used to suck the liquid from the animal's body after washing.

French patent No. 2 543 795 discloses a container for cleaning and drying an animal introduced therein. The device comprises a top cover which is transparent and curved, and four lateral walls, one of which can be lowered in order to introduce the animal. The cleaning device comprises a water-shampoo mixing device and shower-type means. The drying device comprises a ventilator.

French patent No. 2 580 467 relates to a device which is C-shaped and has a supporting table from which hot air is directed upwardly through holes provided on said table. The hot air is produced by a motor-ventilator group and by electric resistances placed along the path of the air. No suction means for the residue water on the animal's body after cleaning is provided.

U.S. Pat. No. 4,836,144 discloses a device of a recirculating type, with a pump which continuously pumps in a "circle-path" water or a disinfecting solution filling a container, in order to clean an animal.

SUMMARY OF INVENTION

It is an object of the present invention to provide a piece of furniture mounted on wheels, having a table like-structure and having on its upper part a supporting plane for an animal formed by a tray-like detachable element. Inside said piece of furniture there are provided at least two chambers, one of which is sealed and contains electrical devices and the remaining one/ones containing an assembly of means which allow the suction away of all the water present on the animal's fur after it has been washed and rinsed. The means also allow the emission of hot air under pressure by other than means which necessitate the employment of electrical resistances. The hot air is used to dry up completely the animal, whereas the upper tray-like plane permits the easy execution of any operation regarding the grooming of animals (e.g. shearing, coiffure, removal of parasites). Said piece of furniture allows two or more operators to work simultaneously. According to the present invention, the assembly comprises: an annular blower, driven by an electric motor and associated with blowing and suction ducts, which terminate into pipe unions located outside said piece of furniture, and which are to be connected respectively to flexible tubes which end into shaped hoses. To the suction duct, coming from the hose and flexible suction tube, there is associated a tank having a vertical axis and provided on its upper part with a filter, which serves to retain hairs or other impurities which have been sucked. The tank serves for collecting water in its lower part, and is connected, below said filter, to a duct which is in communication with the suction aperture of the blower. The emission aperture of hot air is directly connected to the hot air exit duct from the piece of furniture.

BRIEF DESCRIPTION OF DRAWINGS

The invention will be more clearly understood, and its further advantages will be shown more fully by means of the following description and the annexed drawings, which relate to three different embodiments of the invention, which are given for illustrative and not limitative purposes. In the drawings:

FIG. 1 is a perspective view of the front upper part and of the left side of the piece of furniture with the supporting table, of the present invention, according to a first embodiment;

FIG. 2 is the vertical cross section which is obtained along the line (X—X) of FIG. 3, parallel to the front side of the piece of furniture, which illustrates the respective positions of the components of the operative assembly inside the piece of furniture;

FIG. 3 is a top view of the lower part of the piece of furniture, taken along line y—y of FIG. 2;

FIGS. 10 and 11 respectively show a top view (FIG. 10) and a view taken from the end of the hot air emission aperture of a blowing hose having a tubular form like a truncated cone followed by a cylinder, the hot air being emitted along the direction of arrow F2 of FIG. 10, said view being taken in the direction perpendicular with respect to the axis of the hose, and from the end where the hot air emission aperture is located;

FIGS. 12 and 13 respectively show a lateral longitudinal view (FIG. 12) and a top view (FIG. 13) of a special composite pipe, which comprises an upper ejection duct of hot air under pressure to be connected to the flexible tube supplying hot air, and a lower suction duct;

FIG. 14 shows, in an enlarged scale, a vertical cross section of the upper part of the peripheral wall of the piece of furniture and of the covering tray-like element, similar to that shown in FIG. 2, in order to show the details of the hooking system between the shaped edge of the covering element and the upper edge of the piece of furniture;

DETAILED DESCRIPTION OF THE PREFERRED EMBODIMENT

Figure 4:
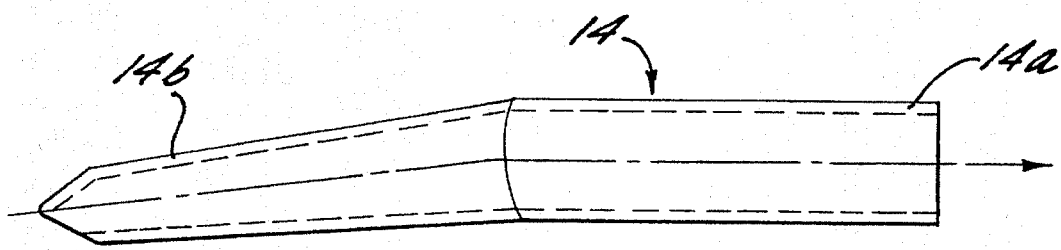
FIGS. 4 and 5 are respectively a lateral longitudinal view and a top view of a suction hose, according to a first variation.

With reference to the first embodiment of FIGS. 1 to 3, the reference number 1 generally indicates the piece of furniture, having a rectangular base and comprising a supporting structure comprising peripheral vertical walls 1a and a base wall 1b, said elements forming a tank-like element which is open at its upper end. Between the walls 1a and the base wall 1b, a horizontal wall 1c is fixed, while another vertical wall 1d is fixed between this latter and the base wall 1b, dividing said space into two spaces A and B. Above the wall 1c, at the right side of FIG. 2, a space C is provided which is upperly bounded by an upper wall 1f, a left vertical wall 1e, by part of the wall 1c, and by three adjacent walls 1a. The chamber C is sealed. The wall 1f is arranged at a predetermined distance from the edge of the piece of furniture 1, while on the remaining part above the wall 1c it forms a space D which contains a drawer 8. The drawer slides along rail bearings 30, and has a front wall 8a, said drawer being designed for storing instruments and additionals employed for the grooming of animals. The upper opening of the piece of furniture 1 is closed by a covering tray-like element 2, having peripheral shaped edges 2a designed to engage the edges of the piece of furniture 1.

The inner space of the piece of furniture is therefore divided into four spaces A,B,C,D among which only the spaces A,B,C are sealed. Starting from the upper wall 1f of the space C, a vertical rod of variable length 19, 19a, preferably of a telescopic type, extends upwardly. The rod sealingly passes through the covering element 2, while a horizontal arm 19b, more fully described afterwards, projects from the upper end of the vertical rod extending above the tray-like element 2. The lower space A houses a cylindrical tank 3 having a vertical axis, and which is open at its upper end, and in whose upper orifice a filter 4 is mounted. Said space A communicates with the outside by means of a duct 5, which passes through the nearest wall 1a and provides a seal at such point. The duct ends on the outside with a pipe union 5a for attaching a flexible pipe 13, connected to a suction hose.

The sealed space B contains an annular blower 7, of a known type, which is provided with an air suction orifice and an air ejection orifice for hot air under pressure. The blower 7 is driven by an electrical motor 12, which is also mounted inside the space B. The already mentioned space C contains electrical equipment such as control means for the starting and safety devices. In the front part of the piece of furniture there are provided doors 9 and 10 with seals and/or tight means, which allow a user to reach the inner spaces A and B in order to carry out inspections, cleaning and maintenance operations of the operative assembly components contained therein.

The two chambers or spaces A and B are connected to one another by means of a horizontal tube 11, which comes out from the chamber A, and enters into the chamber or space B, then is bent downwardly, forming a hood 11a (shown in partial cross section in FIG. 2). The hood is arranged to be facing the casing 19a of the electric motor 12, which drives the blower 7.

The duct for conveying hot air under pressure produced in the blower 7 is connected with the outside by means of the tube 6, which passes through the parallel walls 1d and 1a by providing a seal, and ends on the outside of the piece of furniture 1 in the form of a pipe union 6a. The pressure-tight crossing points through the walls 1d and 1a are realized by means of known static seals. The suction duct of the blower 7 sucks air from the inside of the space B. According to what has been said, there obviously follows that when the annular blower 7 is in an operating state, it sucks air, through the hood 11a, and the tube 11, from the chamber A and air entering into said chamber A from the outside, through the duct 5. The duct 5 is L-shaped, and its upper branch is horizontal, while the following branch is vertical and oriented towards the aperture of the tank 2. This is so that the fluid stream sucked through the duct 5 will expand into the chamber A, from which it will be sucked through the tube 11, 11a, and it reaches the housing 12a of the electric motor 12 by cooling it. Said air is sucked into the blower or fan 7, where it is even more heated by vortex formation, centrifugation and compression, and it is subsequently expelled to the outside through the duct 6, 6a.

Figure 5:
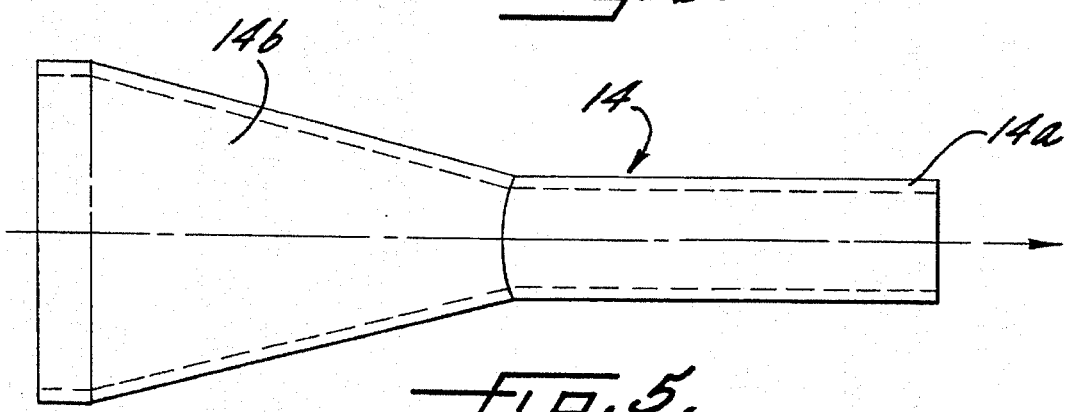
Figure 6:
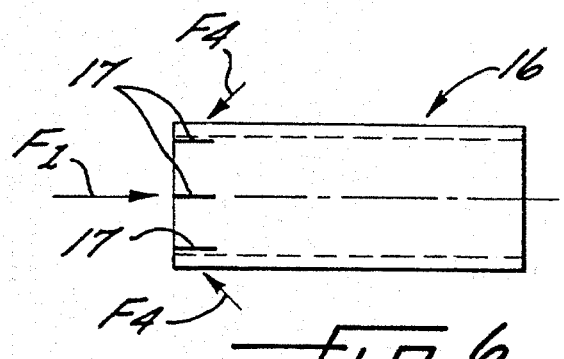
FIG. 6 is a top view of a special hose, consisting of a segment of a tubular element, made of an elastically deformable material, shown in the absence of external forces.
Figure 7:
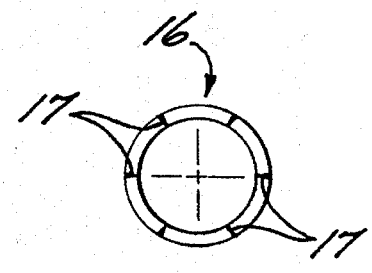
FIGS. 7 and 8 are two views, taken at the suction aperture of the hose in the direction of arrow F1 of FIG. 6, in the absence of external forces (FIG. 7), and, respectively, after the elastic deformation of the hose, caused by the operator's hand (FIG. 8)
Figure 8:
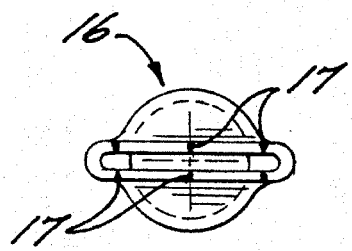
Figure 9:
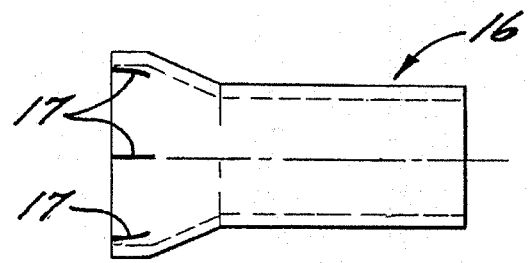
FIG. 9 is a top view of the hose of FIG. 6, elastically deformed as shown in FIG. 8.

On the aperture 5a of the suction duct 5, an end of a flexible tube 13 is inserted which has an appropriate length. On the end 13a of the tube 13, a hose is applied, for example a hose 14 of the type shown in FIGS. 4, 5.

By means of said hose 14 it is possible to suck all the water from the animal's hairs after it has been washed and rinsed, together with detached hairs and everything else present amid the hairs of the animal being treated.

All that is sucked into the duct 5 is dropped into the tank 3, and the hairs and any other solids are retained in the filter 4, while water is deposited on the bottom of the tank 3. The sucked air expands out of the tank into the space A, and then reaches the space B, as has already been explained. Subsequently it enters into the suction aperture of the blower 7, inside which it is heated; afterwards it gets out of the emission aperture which is connected to the duct, until it reaches the outer pipe union 6a. A flexible tube 31 is applied to the outer pipe union, at whose end a hose 15 may be applied, formed by a cylindrical part 15b and by a truncated cone 15a (FIGS. 10, 11). This is used as feeding means of hot air under pressure or "phon" for the final touch of grooming, as for instance the drying of the treated animal. The hose 15 may be held by the hand of the operator or it may be supported by an articulated joint fixed to a wall or mounted on a tripod, so that the operator may employ its hands for other purposes.

On the ends 13a of the tube 13, other particular kinds of hoses may be applied, as for example:

a special hose 16 shown in FIGS. 6–9 comprising a tubular part made of a very flexible material which is elastically deformable (FIG. 6), at whose end short longitudinal cuts 17 are provided uniformly spaced along the periphery.

The hose 16 is preferably used instead of the hose 14, in order to suck water from the hairs of the animal's legs and from the regions where the hose 14 is less effective. In fact, the operator, by using the hose 16, may deform its end with its fingers in the points indicated by the arrows F4 (FIG. 6), said end forming the suction aperture, so that the hose will assume the shape shown in FIGS. 8 and 9. In this way, the suction aperture can be suited to the respective surface portion of the animal's body, where water must be sucked together with detached hairs and other impurities.

As a variant, another composite type hose 18 (FIGS. 12, 13) may be provided, including two separate ducts 32 and 33. Through the duct 32 hot air may be emitted under pressure, in the direction of arrow F6 of FIG. 12, while through the lower duct 33, air, water, detached hairs, etc., may be sucked in the direction indicated by arrow F5. Therefore, the hose 18 allows to feed hot hair under pressure in the respective region of the animal's body, while sucking at the same time water, detached hairs, etc.

Other details will now be given, regarding the components of the piece of furniture 1 and their operative function:

an animal may be laid on the tray-like element 2, and fastened to the hook 20 of the L-shaped arm (19, 19a, 19b), whose height may be adjusted. On said tray-like element 2 the animal may be sheared, combed, parasites may be removed, etc.;

the piece of furniture and everything inside it, is mounted on two coaxial nonpirouetting wheels 27, and onto two feet 28;

on one side of the piece of furniture 1, where the two pipe unions 5a and 6a and the feet 28 are arranged, at least one handle is provided (not shown), to be able to life the piece of furniture 1 while displacing it on the wheels 27;

the covering tray-like or tank-like element 2, is supported along its curved shaped edge 2a, and is engaged with the edge of the aperture of the piece of furniture 1 (FIG. 14), in a removable way. Said element 2, 2a is preferably made of fiber glass. It may therefore be easily removed, in order to be cleaned. On its bottom surface, a rubber plate 22 or the like is applied.

Other advantages of the present invention are:

a reduced electric energy consumption with respect to conventional drying devices employing hot air, like the "phon", a reduction of noise;

possibility of working simultaneously in three different working stations, i.e.:
a) a dog may be put in a washing tank, where an operator, after the washing and rinsing of the animal, may suck water from the dog's body using one of the hoses 14, 16 or 18;
b) an animal is put on the tray-like element 2, where it is sheared and other toilet operations are done, by a second operator;
c) a third animal, placed on a common small table of any type whatever, may be dried by means of a hose 15 connected to the flexible tube 31, said hose being eventually supported by an arm on an articulated joint.

The operative assembly of the present invention provides a large degree of hygiene, because water, hairs, etc. are deposited on the tank 3 which is easily removable and washable.

Figures 15, 16:
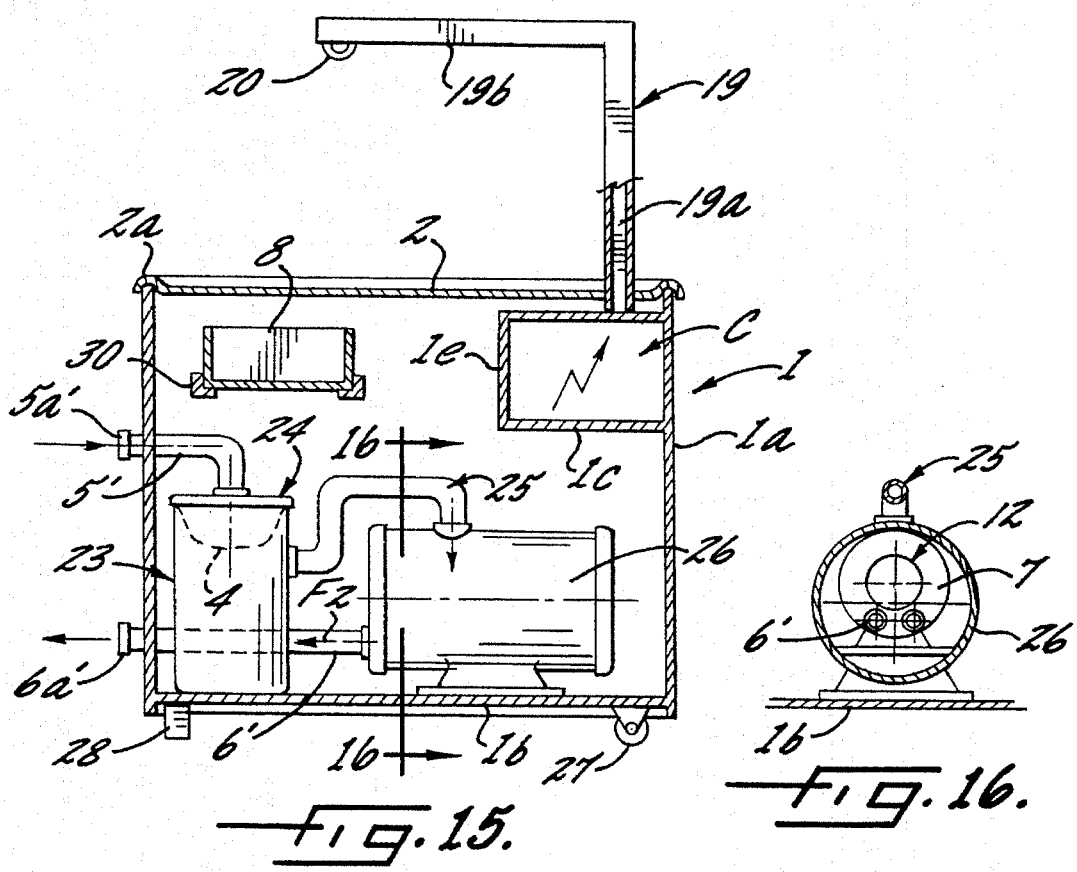
FIG. 15 shows a cross section, similar to that of FIG. 2, of a piece of furniture according to a second embodiment, and in which the inner space is divided into only two chambers or spaces, and in which some components of the operative assembly have been modified.
FIG. 16 shows the detail of the vertical cross section, taken along line Z—Z of FIG. 15 and as seen along the arrows of said cross section.

In an embodiment shown in FIGS. 15 and 16, the piece of furniture 1A, open at its upper end but closed by the tray-like element 2, has its inner space divided into a principal space and a sealed space (C), with the same features described and illustrated in the first embodiment. The inner principal space of the piece of furniture 1A contains a sealed tank 23 supported by the base wall 1b, which is provided internally with a filter 4 and with a cover or closing element 24, crossed by an open end of the suction duct 5' which starts at the external pipe union 5'a. A tube 25, connected to the inside of the tank 23 slightly below the filter 4, realizes an internal communication between the inner chamber of the tank 23 and a second cylindrical tank 26, which is sealed and has a horizontal axis. The annular blower 7 is mounted inside this tank, the blower being driven by the electric motor 12 (see FIG. 16, showing the vertical cross section taken along line A—A of FIG. 15).

The tank 26 is also sealed.

The two tanks 23 and 26 perform the same functions as the sealed chambers A and B of the first embodiment. The piece of furniture 1A performs only the function of containing the two tanks 23 and 26 and the connection tubes 5', 6', and 25'; the piece of furniture 1A is provided internally with the chamber or space C and lodges the drawer 8 as described for the first embodiment.

Figure 17:
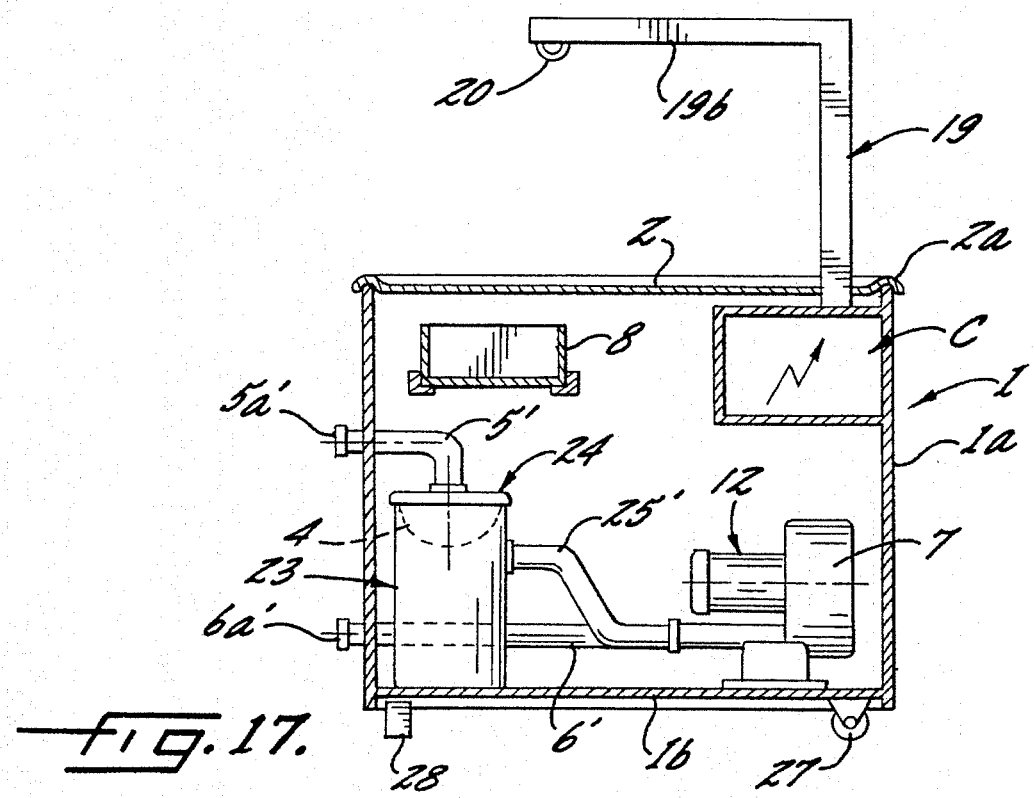
FIG. 17 shows the vertical cross section of the piece of furniture, corresponding to those of FIGS. 2 and 15 which show the first and second embodiment, but according to a third embodiment, relating to a variant of the second embodiment of FIGS. 15 and 16. In the figures according to said three embodiments, the parts of the assembly which are not modified, have the same alpha-numeric reference characters.

A third embodiment of the invention, having a simpler construction, but with the same operational features of that shown in FIGS. 15, 16, is shown in FIG. 17. In this embodiment, the annular blower 7 driven by the motor 12 is simply supported by the base wall 1b of the piece of furniture 1A. The tank 23 and the filter 4 connected to the tube 5', 5'a, is identical to that provided in the second embodiment, whereas the tube 25', coming from the tank 23, is directly connected with the suction (intake) aperture of the blower 7.

The additional devices are neither described nor illustrated, as for example the components of the electric circuits, including sockets for connection to electrical devices like clippers, etc., to be realized according to the existing standards and laws.

A possible indicator of the water level, for example a float, inside the tank 3 or 23 used for collecting water can be provided.

Possible offtakes for the stream of hot air can be connected to the composite hose of FIGS. 12, 13, possibly comprising taps or valves for adjusting the flow rate of the hot air stream to be fed to said hose. If required, other devices necessary to protect against injuries, known to those skilled in the art can also be included.

I claim:

1. An article of furniture having a rectangular base with a bottom wall, upstanding peripheral walls and an open top;

an upper supporting tray closing off the open top of the base and having an anti-slipping material on the top surface thereof, the bottom wall, peripheral walls, and upper tray defining an enclosed internal space;

a telescopingly adjustable vertical rod extending upwardly through the upper tray, a horizontal arm extending from the upper distal end of a vertical rod and overlying a tray and having a hook for retaining an animal on the distal end thereof;

a pair of coaxial wheels on one end of the base and a pair of downwardly projecting feet on the opposite end of the base;

internal horizontal and vertical walls forming a sealed chamber within the base for containing electrical equipment, control and safety devices;

a retaining tank having an open top and a filter mounted on the open top of the retaining tank; an annular blower and an electric motor driving the blower located within the enclosed internal space, the exit end of the blower being connected to a blower port on the exterior of the base, the inlet end of the blower being connected to the retaining tank;

a suction port on the exterior of the base;

a suction duct within the enclosed internal space extending from the suction port and terminating above the filter on the open end of the tank; and a flexible suction hose connected to the suction port and a flexible blower hose connected to the blower port, both hoses being external of the base.

2. The article of furniture according to claim 1, wherein said flexible blower hose has a cylindrically shaped portion for connecting to the blower port and an exit end, said hose being tapered along said exit end to form a reduced diameter free end.

3. The article of furniture according to claim 1, wherein said flexible suction hose has a tubular portion for connecting to the suction port, said flexible suction hose having a gradually flattened and widened terminal portion which forms a suction aperture in the form of an elongated rectangular slot.

4. The article of furniture according to claim 1, wherein said flexible suction hose includes a part for connecting to said suction port and an end defining a suction aperture, said end being substantially tubular in an initial resting state and being formed from a flexible and elastically deformable material, said end including a plurality of longitudinal cuts in the hose material to thereby enable an operator to selectively flatten the end to form a substantially rectangular suction aperture.

5. The article of furniture according to claim 1, wherein the suction hose includes a suction aperture and the blower hose includes an exit end, and said suction and blower hoses are attached together adjacent the suction aperture and exit end to form a composite hose.

6. The article of furniture according to claim 1, wherein said internal space is divided into two upper chambers and two lower chambers, one of said upper chambers being open upwardly and containing a drawer mounted on guide bearings therein, said drawer being accessible from external of the base;

said two lower chambers being divided by a vertical wall and accessible by way of access doors located on one of said upstanding peripheral walls, one of said lower chambers containing said tank and suction duct and the other of said lower chambers containing said electric motor, and a blower duct connecting the chamber containing the tank with the chamber containing the electric motor, said blower duct passing through the vertical wall separating the chambers in sealed relationship therewith and forming a hood arranged above the electric motor thereby enabling air which passes through the blower duct to pass over said motor and enter a suction aperture of the blower.

7. The article of furniture according to claim 1, further comprising a drawer slidable on a guide bearing and arranged within the enclosed internal space laterally with respect to said sealed chamber; and wherein said sealed chamber is positioned slightly below the open top of said rectangular base, and said vertical rod extends upwardly from an upper horizontal wall forming part of said sealed chamber; and said retaining tank has a vertical axis and is mounted on said bottom wall of the rectangular base and sealed by a cover, said suction duct crossing the cover and extending into said tank; and a blower's duct extending from said tank at a point below said filter and extending into a second cylindrical tank which is sealed and has a horizontal axis and inside which are mounted said electric motor and annular blower such that a suction aperture of said blower opens inside said tank and said exit end is connected to an exit duct which sealingly extends through said tank and connects to said blower port.

8. The article of furniture according to claim 1, wherein said retaining tank has a vertical axis and is mounted to said bottom wall of the rectangular base and sealed by a cover, and said suction duct crosses the cover and extends into the tank, and said blower and electric motor are mounted to said bottom wall, and a blower's duct extends from said retaining tank at a point below said filter to the inlet end of said blower, and said retaining tank, blower and electric motor are located within a portion of said enclosed internal space which is open upwardly and closed off by said upper supporting tray.

9. The article of furniture according to claim 1, wherein said retaining tank includes a water level indicator.

10. The article of furniture according to claim 1, wherein at least one of said suction and blower hoses includes means for adjusting the flow rate of a material traveling therethrough.

* * * * *